Sept. 13, 1932. J. K. NORTHROP ET AL 1,877,021
INSTRUMENT BOARD
Filed June 14, 1930
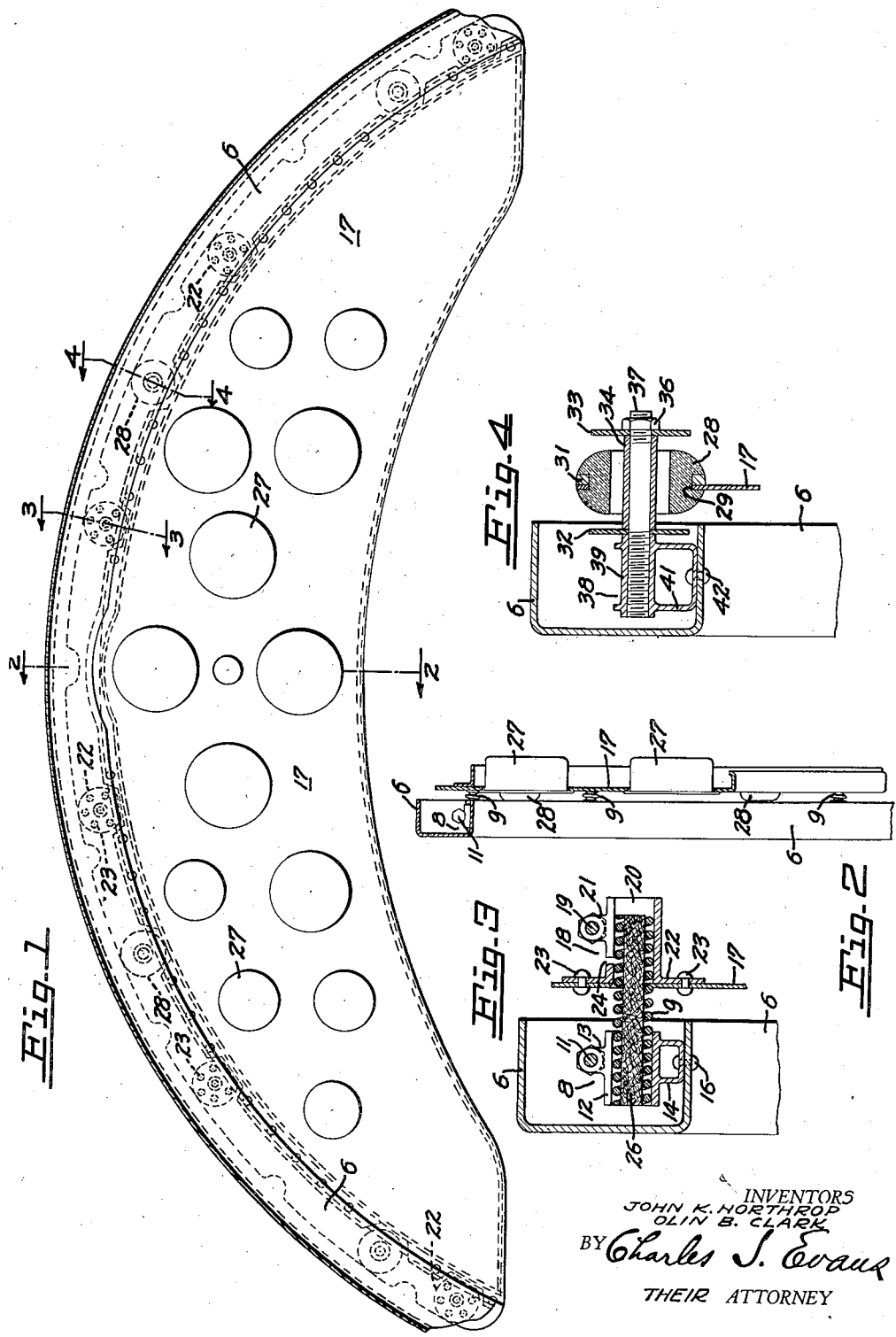
INVENTORS
JOHN K. NORTHROP
OLIN B. CLARK
BY Charles J. Evans
THEIR ATTORNEY Patented Sept. 13, 1932

1,877,021

UNITED STATES PATENT OFFICE

JOHN K. NORTHROP, OF GLENDALE, AND OLIN B. CLARK, OF BURBANK, CALIFORNIA, ASSIGNORS TO NORTHROP AIRCRAFT CORPORATION, OF LOS ANGELES, CALIFORNIA, A CORPORATION OF DELAWARE

INSTRUMENT BOARD

Application filed June 14, 1930. Serial No. 461,121.

Our invention relates to an instrument board and a resilient mounting for instruments thereon.

An object of our invention is to provide a resilient mounting for delicate instruments; and particularly for instruments subject to vibrations such as those present in the frame of an airplane.

Another object is to provide a shock absorber to protect the instruments against injury in the event of a severe bump such as that caused by a poor landing.

The invention possesses other objects and features of advantage, some of which, with the foregoing, will be set forth in the following description of our invention. It is to be understood that we do not limit ourself to this disclosure of species of our invention, as we may adopt variant embodiments thereof within the scope of the claims.

Referring to the drawing:

Figure 1 is a front elevation of the instrument board of our invention.

Figure 2 is a transverse sectional elevation of the board. The plane of section is indicated by the line 2—2 of Figure 1.

Figure 3 is a fragmentary sectional view of a resilient mounting. The plane of section is indicated by the line 3—3 of Figure 1.

Figure 4 is a fragmentary sectional view of a bumper. The plane of section is indicated by the line 4—4 of Figure 1.

Broadly stated our invention comprises an instrument board with means for its resilient support, and means for resiliently limiting the movement of the board. This device may be employed on any machine subject to heavy vibration but for the sake of convenience it is described herein in conjunction with an airplane.

In greater detail the instrument board of our invention is mounted on a curved channel 6, which comprises a portion of the fuselage or frame. Fixed on this channel at suitable intervals are the spring clamps 8, in which the supporting springs 9 are held by means of the bolts 11.

The clamps 8 have a split cylindrical portion 12, which has the bolt lugs 13 adjacent the split on top, and a bracket 14 on the bottom by means of which the clamp is fixed to the channel by the rivet 16.

The instrument panel 17 is fixed to a second set of spring clamps 18, which are held on the outer ends of the springs by the bolts 19.

The clamps 18, have a split cylindrical portion 20, which has the bolt lugs 21 adjacent the split on top, and a circular flange 22 on one end by means of which the clamp is fixed to the panel by the rivets 23. A transverse slot 24 is cut in the cylindrical portion adjacent the flange to permit the outer end of the cylinder to act as a clamp. A rod of felt 26 is inserted in the springs to damp their motion. These springs absorb the vibration of the frame and thus protect the instruments 27 which are mounted on the panel in the usual manner.

In order to damp the vibrations successfully, the springs must have a rather low natural period of vibration which necessitates that they be quite flexible. The springs alone might therefore permit the instrument board to hit the frame and receive a severe jolt when the ship lands hard or pitches in rough weather. To prevent this a resilient restraining means is provided to limit the travel of the board. Rubber bumpers are one very satisfactory form of such restraining means.

In the preferred form shown these bumpers include a rubber grommet 28 which is inserted in a hole 29 in the panel board. A spacer ring 31 is also inserted in the grommet to accommodate the panel thickness to a commercial size of grommet.

The grommet, and hence the instrument board, is free to move about within the limits defined by the fixed restraining means built up of the washers 32 and 33, and the tube 34, which are held by the nut 36, on the bolt or stud 37, which is threaded into the bracket 38 fixed to the channel. These brackets have a cylindrical portion 39, which is tapped to receive the bolt; and a foot 41 by means of which the bracket is fixed to the channel by the rivet 42. The tension caused by the nut 36 is sufficient to lock the device together. The bracket, stud, and washers thus form a spatially disposed fixed restraining means or abutment for the grommet and panel.

The grommet used is quite soft and resilient so as to cushion the panel board and protect the instruments. It can be readily seen from the drawing that the grommet will limit the travel of the board in any direction so that it is impossible for the frame to transmit a sharp shock to the instruments no matter how roughly the ship is pitching.

We claim:

1. In combination with an instrument panel, resilient supporting means for the panel, and resilient bumpers for the panel.

2. In combination with an instrument panel, a frame, resilient supporting means attaching the panel to the frame, an abutment mounted on the frame, and a resilient bumper interposed between the panel and the abutment, said abutment being positioned for limiting the motion of the panel in all directions.

3. In combination with an instrument panel, a frame, resilient means for supporting the panel on the frame, a stud fixed on the frame and extending through the panel, a flange on the stud on each side of the panel, and a soft rubber grommet disposed on the panel about the stud and between the flanges.

4. The combination with an instrument panel, a frame, resilient means for supporting the panel on the frame, restraining means comprising an abutment fixed on the frame, and a resilient bumper fixed on the panel and spaced from the abutment.

In testimony whereof, we have hereunto set our hands.

JOHN K. NORTHROP.
OLIN B. CLARK.